United States Patent
Hara

(10) Patent No.: US 7,443,433 B2
(45) Date of Patent: Oct. 28, 2008

(54) PIXEL COMPENSATING CIRCUIT, METHOD FOR COMPENSATING PIXELS, AND IMAGE TAKING APPARATUS EMPLOYING SUCH PIXEL COMPENSATING CIRCUIT

(75) Inventor: Manabu Hara, Kanagawa (JP)

(73) Assignee: Sony Corporation (JP)

( * ) Notice: Subject to any disclaimer, the term of this patent is extended or adjusted under 35 U.S.C. 154(b) by 760 days.

(21) Appl. No.: 10/761,683

(22) Filed: Jan. 21, 2004

(65) Prior Publication Data

US 2004/0150731 A1    Aug. 5, 2004

(30) Foreign Application Priority Data

Jan. 23, 2003    (JP)    ............... P2003-014331

(51) Int. Cl.
- H04N 9/64    (2006.01)
- H04N 3/14    (2006.01)
- H04N 5/335   (2006.01)
- H04N 9/04    (2006.01)
- H04N 9/083   (2006.01)

(52) U.S. Cl. ............... 348/246; 348/247; 348/280
(58) Field of Classification Search ............. 348/245, 348/246, 247, 251, 243, 262–265, 272, 273, 348/280; 382/167, 254, 275, 300
See application file for complete search history.

(56) References Cited

U.S. PATENT DOCUMENTS

| 6,900,836 B2 * | 5/2005 | Hamilton, Jr. ............. 348/241 |
| 6,970,194 B1 * | 11/2005 | Smith ........................ 348/247 |
| 7,102,673 B2 * | 9/2006 | Kimura ..................... 348/246 |
| 2004/0036788 A1 * | 2/2004 | Chapman et al. ......... 348/308 |
| 2004/0096125 A1 * | 5/2004 | Alderson et al. .......... 382/312 |

FOREIGN PATENT DOCUMENTS

| JP | 06-153087 A | 5/1994 |
| JP | 06-165044 A | 6/1994 |
| JP | 09-284783 A | 10/1997 |
| JP | 10-126795 A | 5/1998 |
| JP | 2000-244823 A | 11/2000 |
| JP | 2000-308082 A | 11/2000 |
| JP | 2001-307079 A | 11/2001 |

* cited by examiner

Primary Examiner—Ngoc-Yen Vu
Assistant Examiner—Albert H Cutler
(74) Attorney, Agent, or Firm—Lerner, David, Littenberg, Krumholz & Mentlik, LLP

(57) ABSTRACT

The present invention relates to a pixel compensating circuit, an image taking apparatus employing such pixel compensating circuit, and a method for compensating pixel, wherein a defect pixel existed on an image sensor is effectively compensated. Namely, plural kinds of color information of a defect pixel and adjacent pixels having no defect are stored in a color information holding unit, and a difference calculating unit calculates a difference between color information without defect among color information of the defect pixel and color information of the adjacent pixels. Then, a reference pixel determining unit determines a reference pixel that makes the sum of the absolute values for the differences calculated at the difference calculating unit minimum among adjacent pixels, and a compensating unit compensates defect color information of the defect pixel based on an average value obtained by calculating average value of the differences for the reference pixel.

18 Claims, 7 Drawing Sheets

FIG.2

| PIXEL 1 | PIXEL 2 | PIXEL 3 |
|---|---|---|
| R1:78<br>G1:63<br>B1:63 | R2:191<br>G2:176<br>B2:178 | R3:220<br>G3:204<br>B3:209 |
| PIXEL 4<br>R4:121<br>G4:108<br>B4:110 | DEFECT PIXEL 0<br>R0:59<br>G0:250<br>B0:48 | PIXEL 5<br>R5:207<br>G5:194<br>B5:193 |

FIG.3

| PIXEL 1 | PIXEL 2 | PIXEL 3 |
|---|---|---|
| dr=19<br>\|dr\|+\|db\|=34<br>db=15 | dr=132<br>\|dr\|+\|db\|=262<br>db=130 | dr=161<br>\|dr\|+\|db\|=322<br>db=161 |
| PIXEL 4<br>dr=62<br>\|dr\|+\|db\|=124<br>db=62 | DEFECT PIXEL 0 | PIXEL 5<br>dr=148<br>\|dr\|+\|db\|=293<br>db=145 |

FIG.6

| PIXEL 1 (R1, G1, B1) | PIXEL 2 (R2, G2, B2) | PIXEL 3 (R3, G3, B3) |
|---|---|---|
| PIXEL 4 (R4, G4, B4) | DEFECT PIXEL 0 (R0, G0, B0) | PIXEL 5 (R5, G5, B5) |
| PIXEL 6 (R6, G6, B6) | PIXEL 7 (R7, G7, B7) | PIXEL 8 (R8, G8, B8) |

FIG.7

| PIXEL 1 (R1, G1, B1) | PIXEL 2 (R2, G2, B2) | PIXEL 3 (R3, G3, B3) |
|---|---|---|
| PIXEL 4 (R4, G4, B4) | DEFECT PIXEL 0 (R0, G0, B0) | PIXEL 5 (R5, G5, B5) |

FIG.8

| PIXEL 1 | PIXEL 2 | PIXEL 3 | PIXEL 4 | PIXEL 5 |
|---------|---------|---------|---------|---------|
| PIXEL 6 | DEFECT PIXEL 0a | DEFECT PIXEL 0b | DEFECT PIXEL 0c | PIXEL 7 |
| PIXEL 8 | PIXEL 9 | PIXEL 10 | PIXEL 11 | PIXEL 12 |

FIG.9A

| PIXEL 1 | PIXEL 2 | PIXEL 3 |
|---|---|---|
| PIXEL 6 | DEFECT PIXEL 0a | DEFECT PIXEL 0a |
| PIXEL 8 | PIXEL 9 | PIXEL 10 |

FIG.9B

| | PIXEL 2 | PIXEL 3 | PIXEL 4 | |
|---|---|---|---|---|
| PIXEL 6 | | DEFECT PIXEL 0b | | PIXEL 7 |
| | PIXEL 9 | PIXEL 10 | PIXEL 11 | |

FIG.9C

| PIXEL 3 | PIXEL 4 | PIXEL 5 |
|---|---|---|
| | DEFECT PIXEL 0c | PIXEL 7 |
| PIXEL 10 | PIXEL 11 | PIXEL 12 |

PIXEL COMPENSATING CIRCUIT, METHOD FOR COMPENSATING PIXELS, AND IMAGE TAKING APPARATUS EMPLOYING SUCH PIXEL COMPENSATING CIRCUIT

BACKGROUND OF THE INVENTION

1. Field of the Invention

This invention relates to a pixel compensating circuit, a method for compensating pixels, and an image taking apparatus employing such pixel compensating circuit, wherein defect pixels included in a video signal obtained from an image sensor are compensated.

2. Description of the Related Art

In a digital still camera and a video camera, a CCD (Charge Coupled Device) image sensor or a CMOS (Complementary Metal-Oxide Semiconductor) image sensor is widely used in a solid state image taking apparatus.

In such image sensor, defect pixels which do not function well are included sometimes among pixels of the image sensor. For example, when such image sensor product is carried by an airplane, there is a problem, wherein some of pixels of the image sensor are sometimes damaged by the passage of a cosmic ray having high energy. Those image sensors having such defect pixels are wasted at assemble stage.

However, this causes high cost in total, so that various methods for compensating defect pixels have been considered so far. For example, there are a sampling hold method where a value of a pixel immediately before (immediate left) a defect pixel is employed as the value for the defect pixel, an averaging method where an average value of two pixels located immediately before and immediately after the defect pixel is employed, and the like. Further, there is another method called an edge detecting method where edge information is detected by taking differences between color information of the defect pixel and color information of adjacent pixels located immediately after the defect pixel, and the compensation is carried out from defect pixel which is thought to be small in its effect.

However, in the above mentioned sampling hold method and the averaging method, there is a problem wherein possibility of carrying out a significant erroneous compensation are high when abrupt edges overlap on the defect pixel, and adequate compensation result can not be expected. Particularly, even when two or more than two pixels in a row have defects, the compensation by the above mentioned methods is carried out uniformly, so that there is a risk of standing out the defect pixel by contrast. From this point of view, although the edge detecting method is one of excellent compensating methods, but the edge detecting method has a problem in which when the compensation is erroneously carried out, the defect pixel may have a color different from periphery because the edge detecting method carries out the compensation by focusing on only one color information.

SUMMARY OF THE INVENTION

This invention is carried out in consideration of the above mentioned point, and an aspect of the present invention is to propose a pixel compensating circuit for compensating defect pixels, and an image taking apparatus employing such pixel compensating circuit. Further, another aspect of the present invention is to propose a pixel compensating method for compensating defect pixels.

In order to solve the above mentioned problems, the present invention proposes a pixel compensating circuit for compensating defect pixels included in a video signal, wherein the pixel compensating circuit comprises: a color information holding unit for holding plural kinds of color information of a defect pixel and pixels adjacent the defect pixel; a difference calculating unit for calculating differences between zero defect color information among the color information of the defect pixel and the color information of the pixels adjacent the defect pixel corresponding to the zero defect color information; a reference pixel determining unit for determining a reference pixel having color information that is the most similar to the zero defect color information; and a compensating unit for calculating an average value of the difference for the reference pixel and the defect pixel, and for compensating the zero defect color information of the defect pixel using the average value.

According to the above mentioned configuration, a reference pixel which is the most similar to a defect pixel is determined, and then defect color information is compensated using an average value of the difference between the defect pixel and the reference pixel.

Further, the present invention propose an image taking apparatus employing the above mentioned pixel compensating circuit for compensating defect pixels.

Still further, the present invention presents a pixel compensating method for compensating a defect pixel of a video signal, comprising the steps of: holding plural kinds of color information of defect pixel and pixels adjacent the defect pixel; calculating differences between zero defect color information among the color information of the defect pixel and the color information of the pixels adjacent the defect pixel corresponding to the zero defect color information; determining a reference pixel having color information that is the most similar to the zero defect color information; calculating an average value of the difference for the reference pixel and the defect pixel; and compensating the zero defect color information of the defect pixel using the average value.

According to the above mentioned method, a reference pixel which is the most similar to a defect pixel is determined, and then defect color information is compensated using an average value of the difference between the defect pixel and the reference pixel.

BRIEF DESCRIPTION OF THE DRAWINGS

In the accompanying drawings:

FIG. 2 is a chart showing one example of held color information;

FIG. 3 is a chart showing a condition wherein a sum of absolute values of differences is calculated;

FIG. 6 is a chart showing one example of held color information per pixel;

FIG. 7 is a chart showing one example where the number of pixels for calculation is reduced;

FIG. 8 is a chart showing one example where three defect pixels are existed in a row; and FIGS. 9A to 9C are charts showing adjacent pixels for calculation in case of compensating defect where three defect pixels are existed in a row, wherein FIG. 9A shows a compensation of a left pixel, FIG. 9B shows a compensation of a center pixel, and FIG. 9C shows a compensation of a right pixel, respectively.

DETAILED DESCRIPTION OF THE PREFERRED EMBODIMENTS

Figure 1:
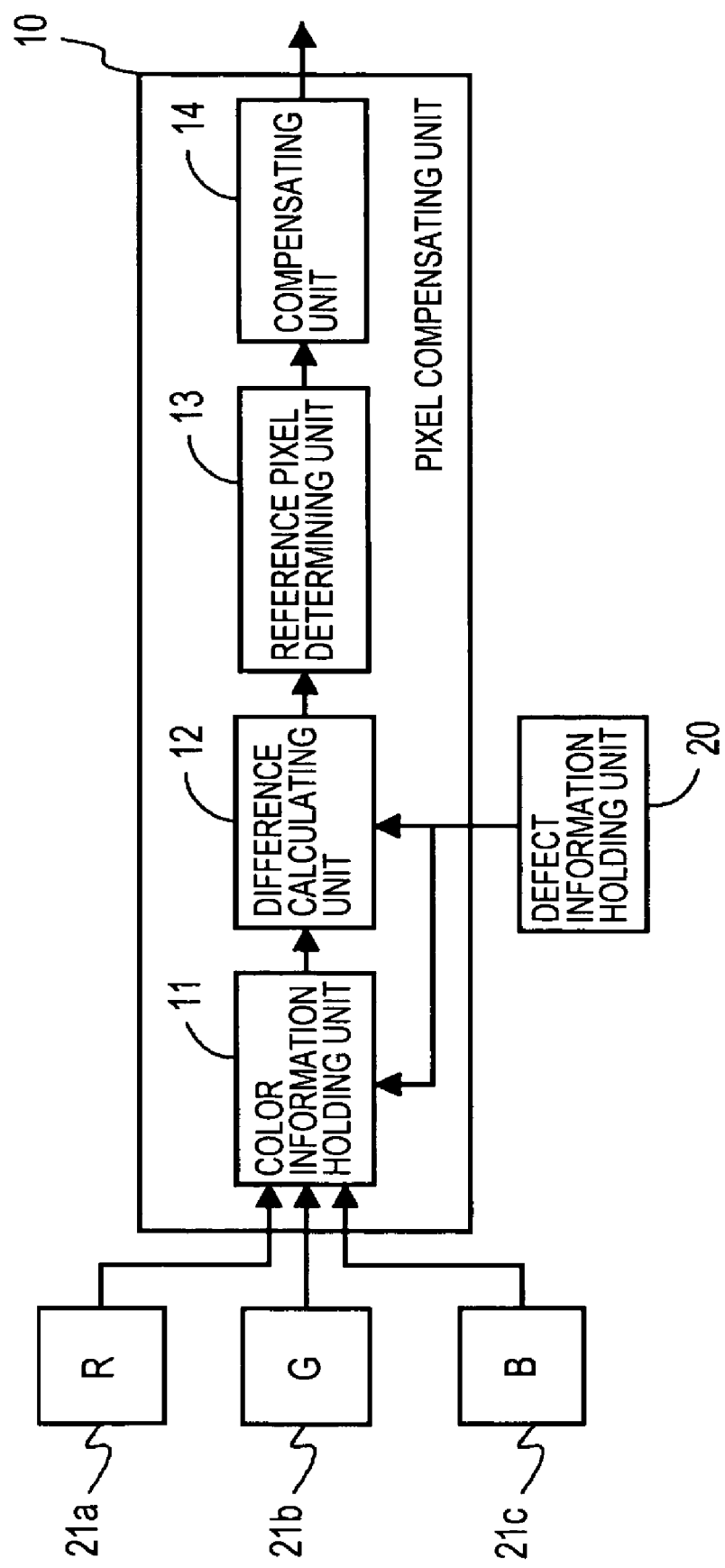
FIG. 1 is a functional block diagram showing a fundamental principle of a pixel compensating circuit according to the present invention.

One embodiment of the present invention will be described with reference to accompanying drawings hereinafter. FIG. 1 is a functional block diagram showing a fundamental principle of a pixel compensating circuit according to the present invention.

A pixel compensating circuit 10 of the present invention comprises of a color information holding unit 11, a difference calculating unit 12, a reference pixel determining unit 13, and a compensating unit 14.

The color information holding unit 11 holds plural kinds of color information for a defect pixel and adjacent pixels having no defect with reference to a position and defect information such as a color for the defect pixel stored in a defect information holding unit 20. More specifically, as shown in FIG. 1, outputs from image sensors 21a, 21b, and 21c provided for each of plural colors such as R (Red), G (Green), and B (Blue) are held as plural kinds of color information per color.

FIG. 2 is a chart showing one example of the held color information. Here, for the purpose of simplifying the description, only a defect pixel 0 having defect in green color G0, and adjacent pixels 1 through 5 are depicted, wherein those adjacent pixels are respectively positioned at left side, right side upper side, upper-left side, and upper-right side. The color information holding unit 11 holds values of R, G, and B which are color information of the defect pixel 0, and the adjacent pixels 1, 2, 3, 4, and 5. For example, regarding the defect pixel 0, the color information holding unit 11 holds a value of 59 for the color R0, a value of 250 for the color G0, and a value of 48 for the color B0 with respect to each color. The color information holding unit 11 also holds values of colors R1 through R5, values of colors G1 through G5, and values of colors B1 through B5 as the color information with respect to all of the adjacent pixels 1 through 5.

The difference calculating unit 12 calculates the differences between the color information without defect among color information of the defect pixel and the same color information of each of the adjacent pixels. For example, in the case of FIG. 2, the differences between values of the color R0 and the color B0, that are not defect colors, among the color information of the defect pixel 0 and values of colors R1 through R5, and B1 through B5 of the adjacent pixels 1 through 5 are calculated with respect to respective colors.

The reference pixel determining unit 13 determines one of the adjacent pixel as a reference pixel for compensation, where sum of the absolute values of the differences calculated at the difference calculating unit 12 becomes a minimum with respect to each color.

The compensating unit 14 calculates an average value of the differences for the reference pixel, and compensates the defect color information of the defect pixel 0 based on the calculated average value.

Hereinafter, an operation of the pixel compensating circuit 10 is explained with reference to FIG. 1 and FIG. 2.

When color information is inputted through the external image sensors 21a, 21b, and 21c, as shown in FIG. 2, the values of R, G, and B are held in the color information holding unit 11 with respect to the defect pixel 0 and each of the adjacent pixels 1 through 5 having no defect. Next, at the difference calculating unit 12, the differences between the values of colors R0 and B0 without defect among the color information of the defect pixel 0 and the values of the colors R1 through R5, and the colors B1 through B5 of the adjacent pixels 1 through 5. Further at the reference pixel determining unit 13, the adjacent pixel where the sum of the absolute values of the differences becomes minimum is selected.

FIG. 3 is a chart showing a condition wherein the sum of absolute values of the differences is calculated.

In this case, a reference code dr designates the respective differences between the values of the colors R1 through R5 for the adjacent pixels 1 through 5 and the value of color R0 for the defect pixel 0, while a reference code db designates the respective differences between the values of the colors B1 through B5 for the adjacent pixels 1 through 5 and the value of color B0 for the defect pixel 0. In addition, the sum of the absolute values of the differences is designated as |dr|+|db|. As being understood from FIG. 3, the sum of the absolute values of the differences for the adjacent pixel 1 becomes 34, and this becomes minimum among the sums for other adjacent pixels 2 through 5. From this fact, it is judged that the adjacent pixel 1 is the one having the color information that is the most similar to the color information of the defect pixel 0, and this adjacent pixel 1 is determined as a reference pixel.

In this case, though neglected in the above description, a weighing unit which applies a coefficient to the differences depending on the distance between the defect pixel 0 and the target adjacent pixel may be provided between the difference calculating unit 12 and the reference pixel determining circuit 13.

Specific explanation will be described later.

Next, one embodiment of a pixel compensating circuit of the present invention is described in detail.

Hereinafter, one embodiment of the pixel compensating circuit of the present invention is described in a case where the pixel compensating circuit is applied to a color imaging apparatus (hereinafter referred to as an image taking apparatus) having image sensors of CCD, CMOS, and the like.

Figure 4:
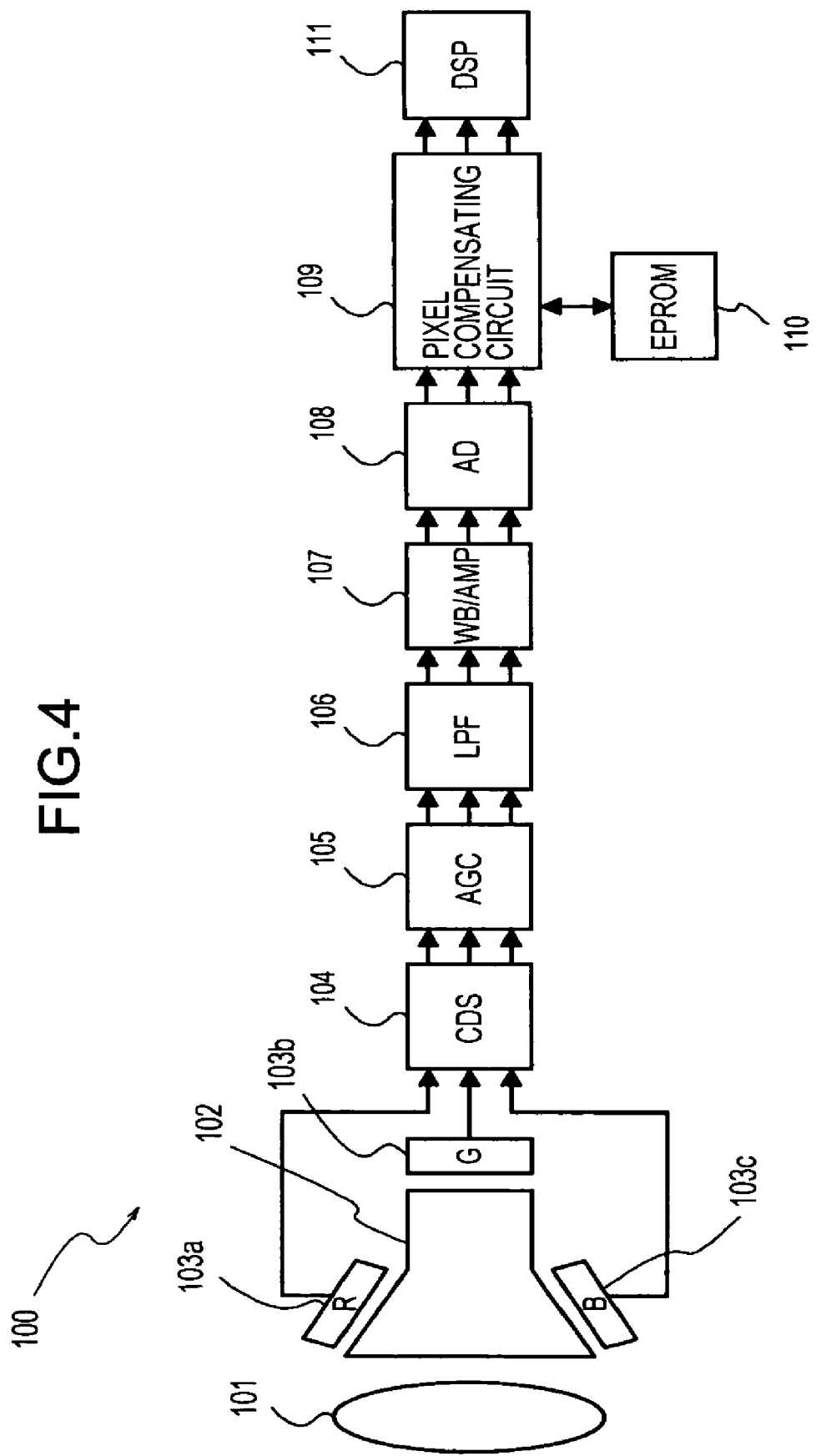
FIG. 4 is a block diagram sowing one example of an image taking apparatus.

FIG. 4 is a block diagram showing one example of an image taking apparatus.

An image taking apparatus 100 comprises of an optical lens system (herein after referred to as a lens) 101 for inputting an image, a color separating optical system (hereinafter referred to as a prism) 102 for separating color information into respective color of R for red, G for green, and B for blue, image sensors 103a, 103b, and 103c provided corresponding to each color of R, G, and B, a CDS (Correlated Double Sampling) circuit 104 for eliminating noises, an AGC (Automatic Gain Control) circuit 105 for adjusting a value of an output signal, a LPF (Low Pass Filter) circuit 106 for eliminating a superfluous signal, a WB/AMP (White Balance/Amplifier) circuit 107 for adjusting a white balance, an AD (Analog-Digital) converting circuit 108 for carrying out an AD conversion, a pixel compensating circuit 109, an EPROM (Erasable Programmable Read-Only Memory) 110 for holding the defect information, and a DSP (Digital Signal Processor) 111 for processing compensated color information.

Incident lights from the lens 101 are separated into R, G, and B at the prism 102, and are irradiated on respective image sensors 103a, 103b, and 103c. These lights are converted into electrical signals by these image sensors 103a, 103b, and 103c, and these electrical signals are converted to digital values at the AD converting circuit 108 after passing through the CDS circuit 104, the AGC circuit 105, the LPF circuit 106, and the WB/AMP circuit 107. Output signals from the AD converting circuit 108 are inputted to the pixel compensating circuit 109 corresponding to the present invention. The pixel compensating circuit 109 properly carries out the compensation of defect pixels based on the defect information such as a defect position, a defect length, a color having defect, and the like recorded in the EPROM 110. Hereinafter, a pixel compensating method of the present invention is described while explaining the operation.

Figure 5:
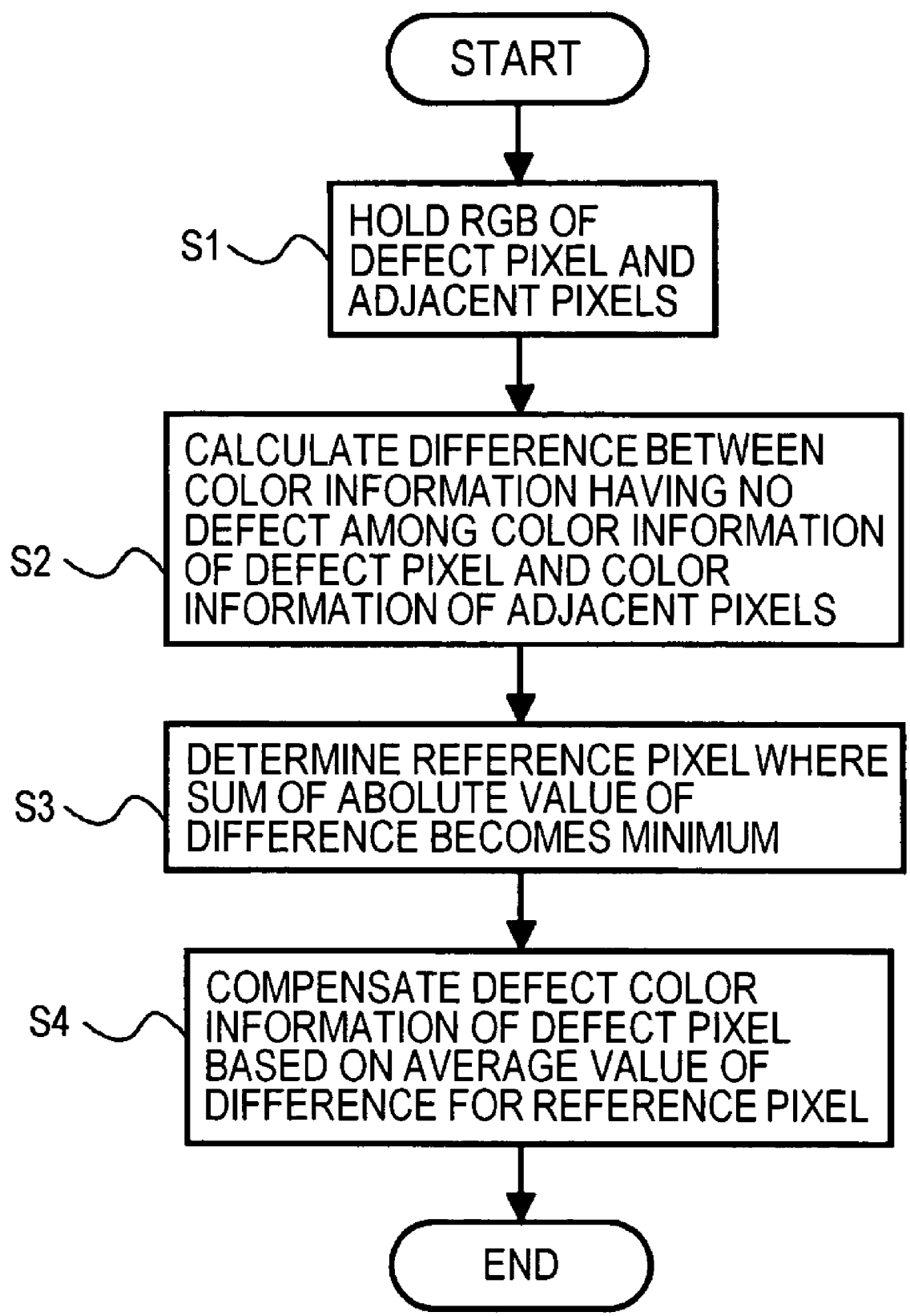
FIG. 5 is a flowchart showing one embodiment of a method for compensating pixels according to the present invention.

FIG. 5 is a flowchart showing one embodiment of a method for compensating pixels according to the present invention. After starting at step START, values of R, G, and B for the defect pixel and the adjacent pixels having no defect are held at step S1. In this embodiment, the values of color R, color G, and color B for the defect pixel and those of the adjacent pixels are held based on the defect information recorded in the EPROM 110.

FIG. 6 is a chart showing one example of the held color information per pixel. As shown in this FIG. 6, values of color R0, G0, and B0 for the defect pixel 0 and the adjacent pixels 1 through 8 are held. As to the defect pixel 0, for example, the values of color R0, G0, and B0 are held, while as to the pixel 1, values of color R1, G1, and B1 are held. Similarly, values of respective R, G, and B are held up to the pixel 8.

A reference pixel in which the sum of the absolute values of the differences becomes minimum is determined at step S3. Here, the sums of the absolute values of the differences per color calculated at step S2 are obtained by a following equation.

$$\Delta x = |Bx - B0 + Gx - G0|, \text{ where } x \text{ varies from 1 to 8.}$$

One of adjacent pixels, wherein the sum of the absolute values of the difference among thus calculated sums $\Delta 1$ through $\Delta 8$ by the above equation corresponding to the pixels 1 through 8 is the minimum, is judged as a pixel having the most similar color information (R, G, and, B) to that of the defect pixel 0, and is defined as a reference pixel to be used for compensation.

The defect color information of the defect pixel 0 is compensated based on the average values of the differences for the reference pixel at step S4.

When one of adjacent pixels, wherein the sum of the absolute values of the difference among thus calculated sums $\Delta 1$ through $\Delta 8$ corresponding to the pixels 1 through 8 is the minimum, is defined as the reference pixel x at step S3, the compensation is carried out by making the color R0 of the defect pixel 0 to be the value that cause to coincide the average values of the differences for the color G and B with the difference for the color R.

Specifically, it is calculated by a following equation.

$$(|Gx - G0| + |Bx - B0|)/2 = Rx - R0$$

Accordingly, $R0 = Rx - (|Gx - G0| + |Bx - B0|)/2$, wherein the Rx, Gx, and Bx are color information for the reference pixel x.

As described above, it is able to carry out the compensation of the defect color R0 for the defect pixel 0.

In this case, it is possible to automatically carry out the proper compensation based on the suitable peripheral or adjacent pixels by continuously operating the present compensating method.

In addition, if there is also a defect in any of colors G1 through G8 of the pixels 1 through 8, it is possible to carry out the compensation by applying a conventional averaging method, a method of coinciding only the difference of the color B with the difference of the color R (wherein the color G is ignored), and a method of calculating without such defect pixel 0.

Further, although it is rare case, if there also exists a defect in the color G0 of the defect pixel 0, it is able to carry out the compensation by applying the above mentioned averaging method, and the pixel compensating method while excluding the color G0.

According to the present invention, it is necessary to hold data such as color information of the defect pixel and adjacent pixels per defect.

FIG. 7 is a chart showing one example where the number of pixels for calculation is reduced.

As described above, when it is necessary to reduce the data capacity for holding the color information, the calculation may be carried out using the pixels of left, right upper, and lower sides relative to the defect pixel 0 as shown in FIG. 7, for example, without using all adjacent pixels 1 through 8 relative to the defect pixel 0.

Then, the case where the length of the defect is 2 pixels or more is described.

In the case where the length of the defect is 2 pixels or more, the pixel compensating method of the present invention may be applied per each defect pixel.

FIG. 8 is a chart showing one example where three defect pixels are existed in a row.

In the case where defects exist in 3 pixels in a row such as the defect pixels 0a, 0b, and 0c, the color information of the adjacent pixels 1 through 12 is held. In the case of compensation, the compensation may be carried out while deciding the adjacent pixel to be applied to the calculation per one pixel as described below.

FIGS. 9A to 9C are charts showing adjacent pixels for calculation in case of compensating defect where three defect pixels are existed in a row, wherein FIG. 9A shows a compensation of a left pixel, FIG. 9B shows a compensation of a center pixel, and FIG. 9C shows a compensation of a right pixel, respectively.

In case of compensating the defect pixel 0a on the left side, it is able to compensate the defect color information of the defect pixel 0a with the defect compensating method as shown in FIG. 5 by calculating the differences between the color information of pixels 1, 2, 3, 6, 8, 9, and 10 and the color information other than the defect color information of the defect pixel 0a.

Further in case of compensating the defect pixel 0b located at center, it is able to compensate the defect color information of the defect pixel 0b using the color information of pixels 2, 3, 4, 6, 7, 9, 10, and 11 as shown in FIG. 9B, and further, in case of compensating the defect pixel 0c on the left side, it is able to compensate the defect color information of the defect pixel 0c using the color information of pixels 3, 4, 5, 7, 10, 11, and 12 as shown in FIG. 9C.

Further, in the case of FIG. 9B, the pixels 6 and 7 are located farther from the defect pixel 0b than the other pixels 2, 3, 4, 9, 10, and 11. Accordingly, it is thought that the pixels 2, 3, 4, 9, 10, and 11 have higher correlation with the defect pixel 0b than the pixels 6 and 7. Therefore, in case of compensation, the calculation is carried out by doubling the difference between the color information of the defect pixel 0b and the color information of the pixels 6 and 7.

In addition, when driving the CCD using an interlaced scanning, data of the upper side and the lower side of the defect are in a state where they are aligned away from the defect pixel by one pixel to be precise. This is similar to the interlacing of the television system. In the odd field, pixels on 1st, 3rd, 5th, ... line are employed, and pixels on 2nd, 4th, 6th, ... line are employed in the even field. In this situation, it is so considered that the pixels on left and right sides of the defect pixel 0b may have higher correlation with the defect pixel 0b than the pixels on upper and lower sides of the defect pixel, so that the calculation may be carried out using the difference between the color information of the defect pixel 0b and the color information of the pixels 6 and 7 as it is.

As described above, it is able to carry out a precise compensation to the defects of continuing 2 or more pixels. In the above embodiment, the colors R, G, and B are employed for description, but they are not limited to them, and the colors of cyan, magenta, and yellow may be employed and they may be more than three colors.

What is claimed is:

1. A pixel compensating circuit for compensating defect pixels included in a video signal comprising:
   a color information holding unit for holding plural kinds of color information of a defect pixel and pixels adjacent said defect pixel, said color information of said defect pixel including defective color information and non-defective color information;
   a difference calculating unit for calculating differences between non-defective color information of said defect pixel and corresponding color information of said pixels adjacent said defect pixel;
   a reference pixel determining unit for determining a reference pixel having color information that is the most similar to said non-defective color information; and
   a compensating unit for calculating an average value of said differences between said reference pixel and said defect pixel, and setting defective color information of said defect pixel to the value of the corresponding color information of said reference pixel minus said average value.

2. The pixel compensating circuit as cited in claim 1, wherein:
   said reference pixel determining unit determines said reference pixel so that the sum of the absolute values of said differences becomes minimum.

3. The pixel compensating circuit as cited in claim 1, wherein:
   when there exists defect in the adjacent pixel, said adjacent pixel having defect or defective color information of the adjacent pixel having defect is excluded.

4. The pixel compensating circuit as cited in claim 1, wherein:
   said compensation is carried out per one pixel when said defect pixel are 2 or more in a row.

5. The pixel compensating circuit as cited in claim 1, further comprising:
   a weighting unit for applying a coefficient to said difference depending on a distance between said defect pixel and the focused adjacent pixel.

6. The pixel compensating circuit as cited in claim 1, wherein:
   said video signal is one outputted from a solid state imaging device.

7. A pixel compensating method for compensating a defect pixel of a video signal, comprising the steps of:
   holding plural kinds of color information of defect pixel and pixels adjacent said defect pixel, said color information of said defect pixel including defective color information and non-defective color information;
   calculating differences between non-defective color information among said color information of said defect pixel and corresponding color information of said pixels adjacent said defect pixel;
   determining a reference pixel having color information that is the most similar to said non-defective color information;
   calculating an average value of said differences between said reference pixel and said defect pixel; and
   setting defective color information of said defect pixel to the value of the corresponding color information of said reference pixel minus said average value.

8. The pixel compensating method as cited in claim 7, wherein:
   said reference pixel is determined so that the sum of absolute values of said differences becomes minimum.

9. The pixel compensating method as cited in claim 7, wherein:
   when there exists defect in the adjacent pixel, said adjacent pixel having defect or defective color information of the adjacent pixel having defect is excluded.

10. The pixel compensating method as cited in claim 7, wherein:
    said compensation is carried out per one pixel when said defect pixel are 2 or more in a row.

11. The pixel compensating method as cited in claim 7, wherein:
    a coefficient is applied to said differences depending on a distance between said defect pixel and the focused adjacent pixel.

12. The pixel compensating method as cited in claim 7, wherein:
    said video signal is one outputted from a solid state imaging device.

13. An image taking apparatus including a pixel compensating circuit for compensating defect pixels included in a video signal, wherein said pixel compensating circuit comprising:
    a color information holding unit for holding plural kinds of color information of a defect pixel and pixels adjacent to said defect pixel, said color information of said defect pixel including defective color information and non-defective color information;
    a difference calculating unit for calculating a difference between non-defective color information among said color information of said defect pixel and corresponding color information of said pixels adjacent to said defect pixel;
    a reference pixel determining unit for determining a reference pixel having color information that is the most similar to said non-defective color information; and
    a compensating unit for calculating an average value of said differences between said reference pixel and said defect pixel, and setting defective color information of said defect pixel to the value of the corresponding color information of said reference pixel minus said average value.

14. The image taking apparatus as cited in claim 13, wherein:
    said reference pixel determining unit determines said reference pixel so that the sum of the absolute values of said difference becomes minimum.

15. The image taking apparatus as cited in claim 13, wherein:
    when there exists defect in an adjacent pixel, said adjacent pixel having defect or defective color information of the adjacent pixel having defect is excluded.

16. The image taking apparatus as cited in claim 13, wherein:
    said compensation is carried out per one pixel when said defect pixel are 2 or more in a row.

17. The image taking apparatus as cited in claim 13, further comprising:
    a weighting unit for applying a coefficient to said difference depending on a distance between said defect pixel and the focused adjacent pixel.

18. The image taking apparatus as cited in claim 13, wherein:
    said video signal is one outputted from a solid state imaging device.

* * * * *